US012725864B2

(12) United States Patent
Lu et al.

(10) Patent No.: US 12,725,864 B2
(45) Date of Patent: Sep. 1, 2026

(54) POUCH MODULE AND ELECTRIC VEHICLE INCLUDING THE SAME

(71) Applicant: Hefei Gotion High-Tech Power Energy Co., Ltd., Hefei (CN)

(72) Inventors: Hengfei Lu, Hefei (CN); Shijing Li, Hefei (CN); Hao Liu, Hefei (CN); Xingwu Xu, Hefei (CN)

(73) Assignee: HEFEI GOTION HIGH-TECH POWER ENERGY CO., LTD., Hefei City (CN)

( * ) Notice: Subject to any disclaimer, the term of this patent is extended or adjusted under 35 U.S.C. 154(b) by 820 days.

(21) Appl. No.: 17/795,501

(22) PCT Filed: Jun. 18, 2021

(86) PCT No.: PCT/CN2021/100861

§ 371 (c)(1),
(2) Date: Jul. 27, 2022

(87) PCT Pub. No.: WO2022/041963

PCT Pub. Date: Mar. 3, 2022

(65) Prior Publication Data

US 2023/0061286 A1 Mar. 2, 2023

(30) Foreign Application Priority Data

Aug. 24, 2020 (CN) ........................ 202021781101.4

(51) Int. Cl.
*H01M 50/211* (2021.01)
*H01M 50/249* (2021.01)
(Continued)

(52) U.S. Cl.
CPC ....... *H01M 50/211* (2021.01); *H01M 50/249* (2021.01); *H01M 50/289* (2021.01); *H01M 50/51* (2021.01); *H01M 2220/20* (2013.01)

(58) Field of Classification Search
CPC ............. H01M 50/211; H01M 50/249; H01M 50/289; H01M 50/51; H01M 2220/20;
(Continued)

(56) References Cited

U.S. PATENT DOCUMENTS 10,541,395 B2 * 1/2020 Bessho ............... H01M 50/264
10,587,017 B2 * 3/2020 Zacher ............... H01M 50/249
(Continued)

FOREIGN PATENT DOCUMENTS

CN 111477798 * 7/2020 ............. H01M 2/10
CN 111477799 7/2020
(Continued)

OTHER PUBLICATIONS

CN 111477798 machine English translation (Year: 2020).*
(Continued)

*Primary Examiner* — Michael L Dignan
(74) *Attorney, Agent, or Firm* — LOZA & LOZA, LLP; Michael Fedrick

(57) ABSTRACT

Provided are a soft-package module and an electric vehicle comprising same. The soft-package module comprises at least two module assemblies. Each module assembly is arranged in the length direction of the module assembly, and a intermediate end plate which is used for fixing the module assemblies is arranged between every two adjacent module
(Continued)

assemblies. The soft-package module of the present disclosure has a relatively high volume utilization rate.

13 Claims, 3 Drawing Sheets

(51) Int. Cl.
*H01M 50/289* (2021.01)
*H01M 50/51* (2021.01)

(58) Field of Classification Search
CPC ............. H01M 10/658; H01M 10/625; H01M 10/6554; H01M 50/258; Y02E 60/10
See application file for complete search history.

(56) References Cited

U.S. PATENT DOCUMENTS 11,522,238 B2 * 12/2022 Shimazaki ........ H01M 10/0481
2013/0004822 A1 * 1/2013 Hashimoto ....... H01M 10/6554 429/120
2016/0190526 A1 * 6/2016 Yamada ............. H01M 50/264 180/68.5
2018/0048033 A1 2/2018 Lee et al.
2021/0036389 A1 * 2/2021 Wang ................ H01M 10/6554

FOREIGN PATENT DOCUMENTS

CN 111477931 7/2020
CN 210926187 7/2020
CN 213071272 4/2021
EP 3664186 * 6/2020 .............. H01M 2/10
WO 2019124796 A1 6/2019

OTHER PUBLICATIONS

Extended European Search Report for corresponding European Patent Application No. 21859807.6, dated Oct. 18, 2024.
International search report issued for counterpart Chinese patent application No. PCT/CN2021/100861 mailed on Sep. 18, 2021.

* cited by examiner

POUCH MODULE AND ELECTRIC VEHICLE INCLUDING THE SAME

CROSS-REFERENCE TO RELATED APPLICATIONS

This application is the U.S. national stage of International Patent Application No. PCT/CN2021/100861, filed on Jun. 18, 2021 and entitled SOFT-PACKAGE MODULE AND ELECTRIC VEHICLE COMPRISING SAME, which claims the benefit of priority under 35 U.S.C. § 119 from Chinese Patent Application No. 202021781101.4, filed Aug. 24, 2020. The disclosures of the foregoing applications are incorporated herein by reference in their entirety.

TECHNICAL FIELD

The present disclosure relates to a pouch module, and in particular to a pouch large module in which two modules are overlapped in a length direction, belonging to the technical field of batteries.

BACKGROUND

Compared with a hard cased battery, a pouch battery has an advantage of a high energy density of battery, but the pouch battery module of the same size as the hard cased battery often has no significant power advantage over the latter. This is because a volume utilization rate of cells of the existing pouch battery is not high, and the volume utilization rate of a module formed by the cells is much lower than that of a module formed by the hard cased battery.

The volume utilization ratio of the pouch module formed by pouch cells is not high, which is considerably due to the low utilization ratio along a length direction of the cell. In other words, since the existing pouch battery module has end plates at its two ends, and the module is fixed by using four fixing holes on the end plates, resulting in a low size utilization ratio in the length direction of the module.

SUMMARY

In order to solve the above technical problem, the present disclosure aims to provide a pouch module having a module length twice a length of an existing 390 module and a high volume utilization rate.

In order to achieve the above object, the present disclosure provides a pouch module comprising at least two module assemblies and an outer casing enclosing the module assemblies, wherein the module assemblies are arranged along a length direction of the module assemblies, and an intermediate end plate for fixing the module assemblies is provided in the middle of adjacent module assemblies.

In a specific embodiment of the present disclosure, the pouch module comprises two module assemblies.

In a specific embodiment of the present disclosure, the module assemblies may be connected in series via an intermediate end plate or may be electrically connected with other external modules respectively.

In a specific embodiment of the present disclosure, the pouch module comprises an outer casing for enclosing the module assemblies, and the intermediate end plate is fixedly connected to the outer casing through through holes, for example, is previously fixed and positioned by a bolt, and then fixed by welding. Two through holes are preferably provided, and the two through holes correspond to the through holes of the outer frame.

In a specific embodiment of the present disclosure, the intermediate end plate is provided with a convex plate, and the convex plate is fixedly connected with the outer casing of the pouch module. Preferably, the convex plate is disposed between the two through holes. The intermediate end plate is welded and fixed with the outer casing of the module through the convex plate.

In a specific embodiment of the present disclosure, the intermediate end plate is provided with insulating layers on both sides corresponding to the module assemblies. The insulation layers are preferably formed by PC material, for electrically insulating the internal module assemblies. The intermediate end plate may be a panel having a certain thickness formed by an aluminum alloy material.

In a specific embodiment of the disclosure, each of the module assemblies is a plurality of core assemblies connected in series, each of the core assemblies is a plurality of cores connected in parallel, and the cores are laminated cores or winded cores.

In a specific embodiment of the disclosure, the outer casing of the pouch module comprises a module outer frame, a module side plate and module end plates.

The module outer frame comprises a first panel, a second panel and a third panel opposite to the first panel, the second panel is fixedly connected with the first panel and the third panel respectively, and the module side plate is fixedly connected with the first panel and the third panel respectively; the module outer frame is fixedly connected with the module side plate to form an internal space having openings at both ends, and the module assemblies are placed in the internal space; the two module end plates are fixedly connected with the module outer frame and the module side plate to cover the openings at both ends; and module cover plates are provided on the inner surfaces of the module end plates, and cover plate assemblies are provided on the inner surfaces of the module cover plates.

In a specific embodiment of the present disclosure, a side face of the intermediate end plate, which is close to the third panel, is provided with two through holes corresponding to through holes of the third panel. The through holes of the third panel and the through holes of the intermediate end plate are used to pass through the bolts, and the bolts are locked and fixed with the inbuilt nuts on an intermediate beam of an external case, so as to realize the overall fixing of the pouch module.

In a specific embodiment of the present disclosure, the third panel of the module outer frame is provided with two through holes at the positions close to the intermediate end plate. The two through holes in the third panel are matched with the two through holes of the intermediate end plate in terms of position, and through which the bolts pass.

In a specific embodiment of the present disclosure, the module outer frame is provided at a middle portion thereof with a cutting groove extending transversely through the first panel.

In a specific embodiment of the present disclosure, a lower end of a middle portion of the module side plate is provided with a groove matched with the cutting groove of the module outer frame. The cutting groove and groove cooperate to secure the module to the intermediate beam of the external case.

In a specific embodiment of the present disclosure, the second panel of the module outer frame is provided, at a portion close to the first panel, with protruding faces extending oppositely along a length direction of the second panel.

In a specific embodiment of the present disclosure, the pouch module has a length twice a length of a 390 standard module, and a height and a width same as a height and a width of the 390 standard module.

In a specific embodiment of the present disclosure, the module cover plates are provided on the inner surfaces of the module end plates, and the cover plate assemblies are provided on the inner surfaces of the module cover plates. Herein, the module cover plates are used for insulating the module assemblies, and the cover plate assemblies of the module are used to electrically connect the module assemblies.

The disclosure further provides an electric vehicle, which comprises the pouch module as described above.

The length of the pouch module of the present disclosure is twice as long as that of the standard 390 module, and the utilization ratio of the longitudinal dimension is improved by stacking two module assemblies in the length direction and sharing the intermediate end plate and the fixing hole.

The pouch module of the disclosure can not only save the material and size of one end plate and two fixing holes, and the intermediate end plate may be stepped over the intermediate beam of the external case for secure, so that the limited space of the casing can be better utilized; and when the module assembly is laid flat, a whole liquid cooling plate can be set in the lateral direction for thermal management interaction.

Figure 1:
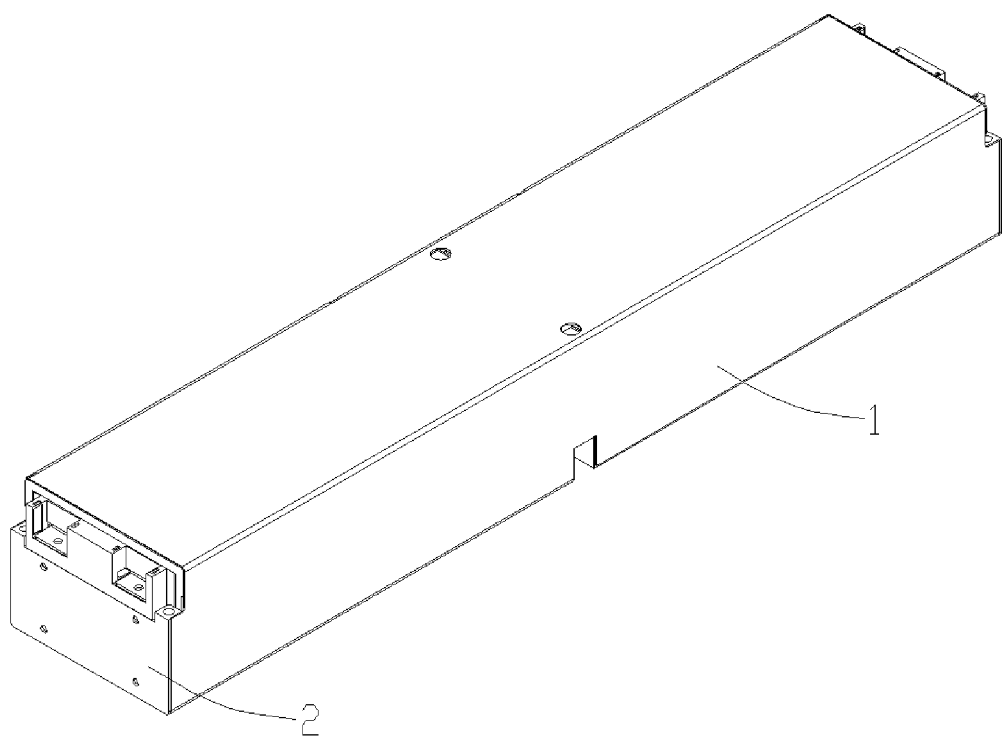
FIG. 1 is a structural schematic of a pouch battery module according to the present disclosure.

DESCRIPTION OF MAIN REFERENCE NUMERALS:

1. module outer frame; 2. module end plate; 3. module side plate; 4. intermediate end plate; 5. module assembly; 6. cover plate assemblies; 7. cover plate; 1-1. first cutting groove; 1-2. first through hole; 1-3. first protruding face; 1-4. second panel; 1-5. third panel; 1-6. first panel; 1-7. first protrusion; 3-1. groove; 3-2. notch; 3-3. welding rib; 3-4. second protruding face; 4-2. insulating layer; 4-1-1. second through hole; 4-1-2. convex plate.

DESCRIPTION OF EMBODIMENTS

In order to have a clearer understanding of the technical features, objects and beneficial effects of the present disclosure, technical solutions of the disclosure will now be described in detail, which should not be construed as limiting the applicable scope of the disclosure.

Embodiment

As shown in FIG. 1, there is provided in the present embodiment a pouch module having a length twice a length of a 390 standard module, as well as a width and a height same as a width and a height of the 390 standard module. The specific dimension of length of the pouch module is twice the length of the 390 standard module plus a dimension of an intermediate beam of an external case.

The pouch module comprises a module outer frame 1, module end plates 2, a module side plate 3, an intermediate end plate 4, two module assemblies 5, and related electrical and insulating parts. The module end plate 4 is provided with four through holes through which the bolts pass. The module is fixed to an intermediate beam of the external case through four through holes of the module end plate and two second through holes 4-1-1 of the intermediate end plate. The intermediate end plate 4, the module outer frame 1 and the module side plate 3 may be provided with matching steps so as to fix the intermediate end plate on the intermediate beam of the external case.

Figure 2:
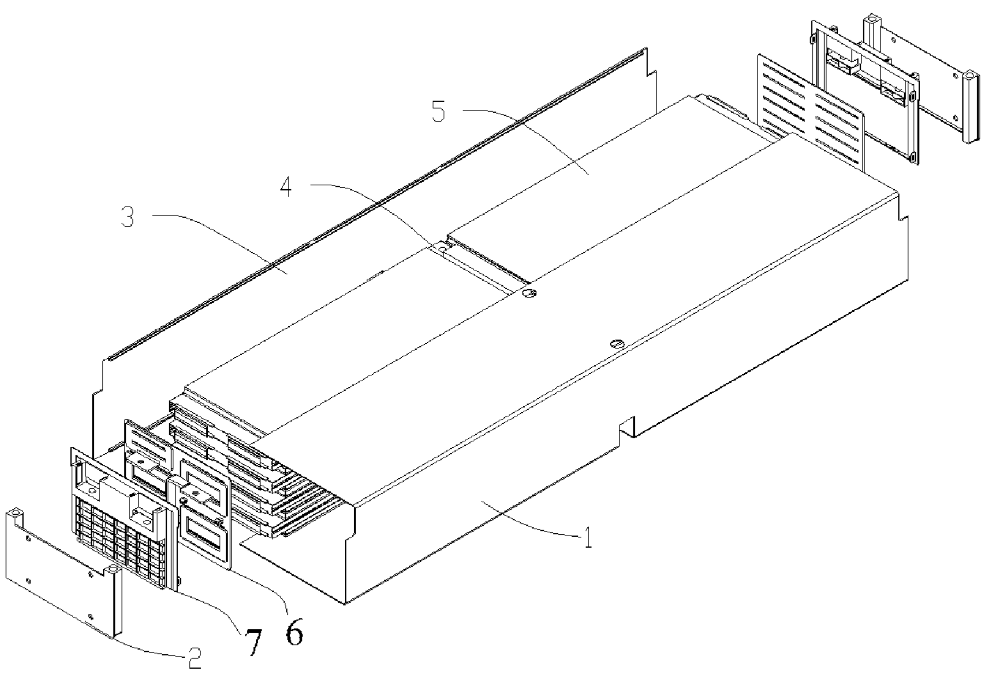
FIG. 2 is an exploded structural schematic of a pouch battery according to the present disclosure.

As shown in FIG. 2, two module assemblies 5 are respectively fixed to two ends of the intermediate end plate 4 along the length direction of the module assemblies. The module outer frame 1 is fixedly connected with the module side plate 3, so as to form a quasi cuboid structure with four faces and openings at two ends thereof. The module outer frame 1 and the module side plate 3 are fixedly connected to form an inner space enclosing the outer circumference of the module assembly. Two end faces of the module assemblies (at the openings at two ends of the quasi cuboid) are provided with cover plate assemblies 6, cover plates 7 are provided on the outer surfaces of the cover plate assemblies 6, and the module end plates 2 are provided on the outer surfaces of the cover plates 7.

Figure 3:
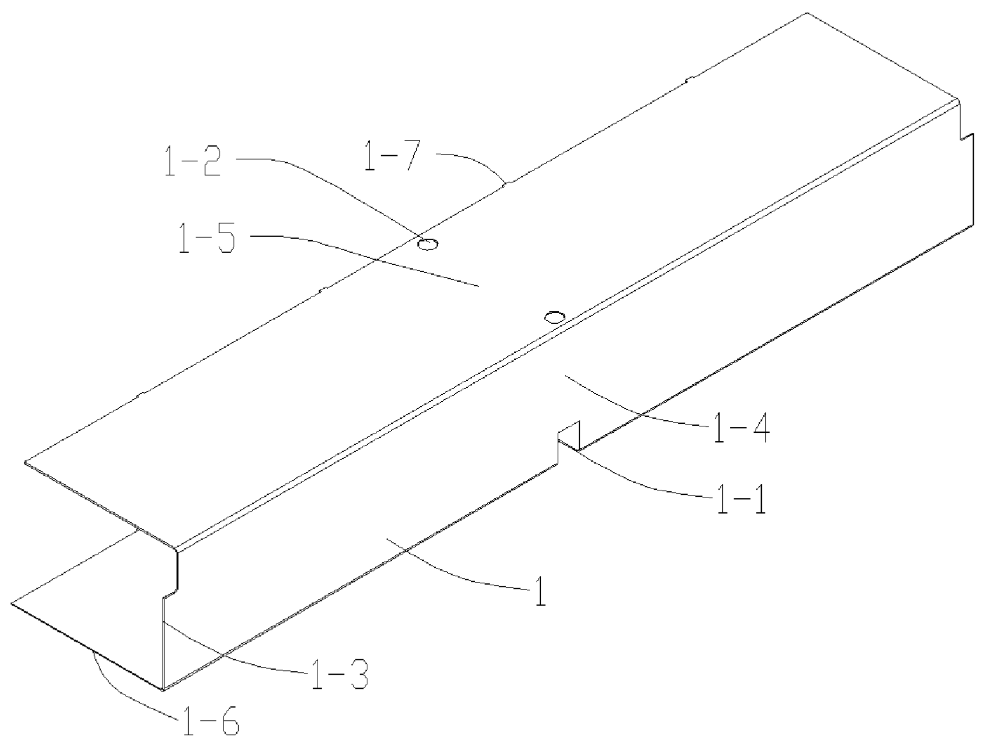
FIG. 3 is a structural schematic of an outer frame of a pouch battery module according to the present disclosure.

As shown in FIG. 3, the module outer frame 1 of the present embodiment includes a first panel 1-6, a second panel 1-4, and a third panel 1-5, wherein the second panel 1-4 is vertically fixedly connected with the first panel 1-6 and the third panel 1-5, respectively. The module outer frame 1 is a punching and bending structure of an aluminum alloy plate. In order to be lightweight, a thickness of the module outer frame 1 may be 1 mm. The middle bottom of the module outer frame 1 is provided with a first cutting groove 1-1 extending transversely through the first panel, so as to facilitate the module assemblies 5 to be fixed on the intermediate beam of the external case. In order to ensure that the middle portion of the module is fixed, two first through holes 1-2 through which the bolts can pass are symmetrically distributed at two sides of the center of the third panel 1-5 of the module outer frame 1. The two bolts pass through the first through holes 1-2, pass through the second through holes 4-1-1 in the intermediate end plate 4, and then are locked and fixed in the inbuilt nuts in the intermediate beam of the external case. The second panel 1-4 of the module outer frame 1 is provided, at a portion close to the first panel 1-6, with first protruding faces 1-3, and the first protruding faces 1-3 are extension faces of the second panel 1-4 toward both ends thereof in a length direction. One longitudinal edge of the second panel 1-4 has the same length as the length of the first panel 1-6, and the other longitudinal edge thereof has the same length as the length of the third panel 1-5. The first protruding faces 1-3 of the second panel 1-4 are each welded and fixed with one side edge of the module end panels 2. The side edges of the first panel 1-6 of the module outer frame 1 are respectively welded with the bottom edges of the module end plate 2 at both ends. A plurality of first protrusions 1-7 may be disposed on a longitudinal edge of the third panel 1-5 which is connected with the module side plate 3.

The module outer frame 1 is provided, at a middle portion thereof, with a first cutting groove 1-1 extending transversely through the first panel 1-6. A middle portion of the second panel 1-4, which is above the first cutting groove 1-1, is welded and fixed to the side face of the intermediate end plate 4. A region between the first through holes 1-2 of the third panel 1-5 of the module outer frame 1 is welded and fixed with the convex plate 4-1-2 on the upper surface of the intermediate end plate 4.

Figure 4:
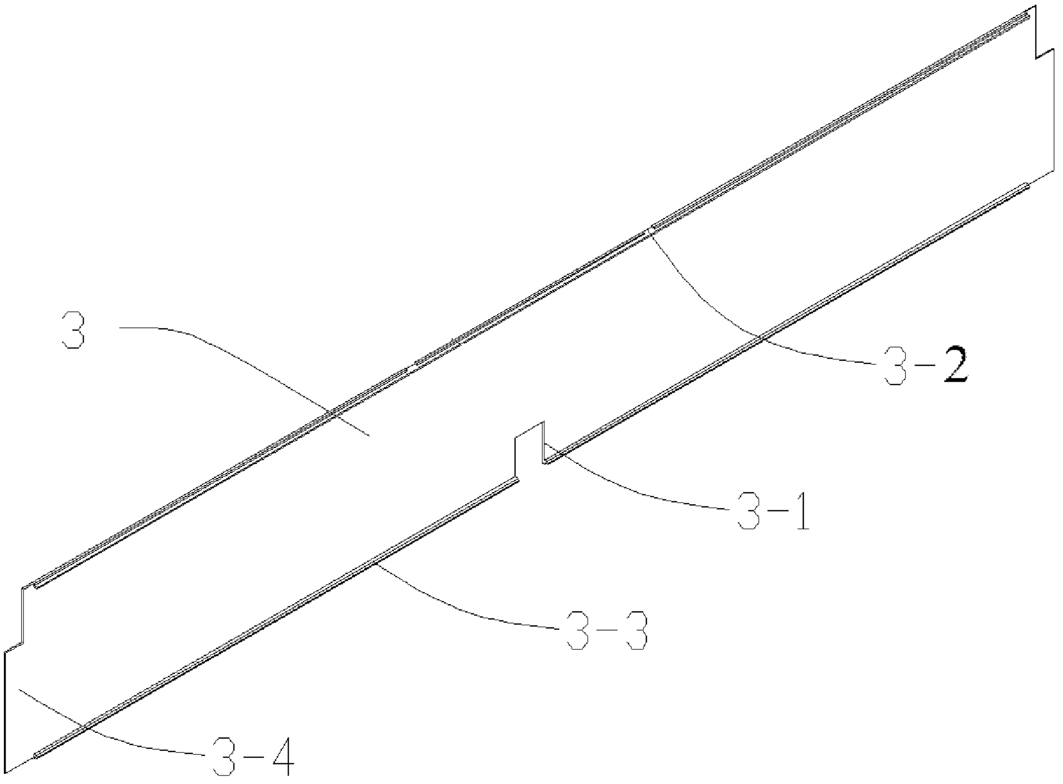
FIG. 4 is a structural schematic of a side plate of a pouch battery module according to the present disclosure.

As shown in FIG. 4, a groove 3-1 corresponding to the first cutting groove 1-1 of the module outer frame 1 is provided at a middle lower position on the module side plate 3. The first cutting groove 1-1 and the groove 3-1 can ensure that the module is fixed to the intermediate beam of the external case. A region of the module side plate 3, which is above the groove 3-1 is welded and fixed to the other side face of the intermediate end plate 4. In order to ensure welding and fixing with the module outer frame 1, two longitudinal edges of the module side plate 3 are provided with integrally extruded welding ribs 3-3. A portion of the module side plate 3, which is close to the first panel, is provided with second protruding faces 3-4 extending to both ends along a length direction of module side plate 3. The second protruding faces 3-4 correspond to the first protruding faces 1-3. The second protruding faces 3-4 are respectively welded and fixed to the other side faces of the module end plates 2 at both ends. Multiple notches 3-2 are uniformly distributed in the welding ribs 3-3 of the module side plate 3. The positions of the notches 3-2 are matched with the first protrusions 1-7, and the first protrusions 1-7 on the module outer frame 1 are inserted into the notches 3-5, such that the module side plate 3 can be fixed with the module outer frame 1 in the length direction. The module side plate 3 may be an aluminum alloy profile extrusion structure.

Figure 5:
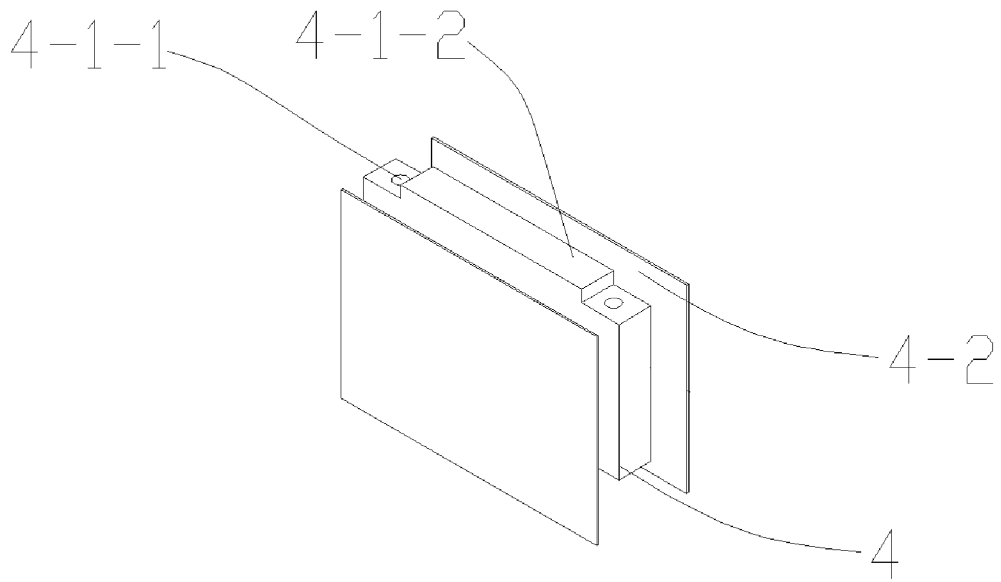
FIG. 5 is a structural schematic of an intermediate end plate of a pouch battery module according to the present disclosure.

As shown in FIG. 5, an insulating layer 4-2 is adhered to each of both faces of the intermediate end plate 4 close to the module assembly 5, and the insulating layer is preferably formed by PC material to ensure the electrical insulation from the internal core. The intermediate end plate 4 is provided with two second through holes 4-1-1 at both ends of the face close to the third panel 1-5, and through which the bolts pass. A convex plate 4-1-2 is provided between the two second through holes 4-1-1 of the intermediate end plate 4, so as to ensure the intermediate end plate 4 to be welded and fixed with the module outer frame 1. The main body of the intermediate end plate 4 may be a panel formed by an aluminum alloy material and having a certain thickness.

Figure 6:
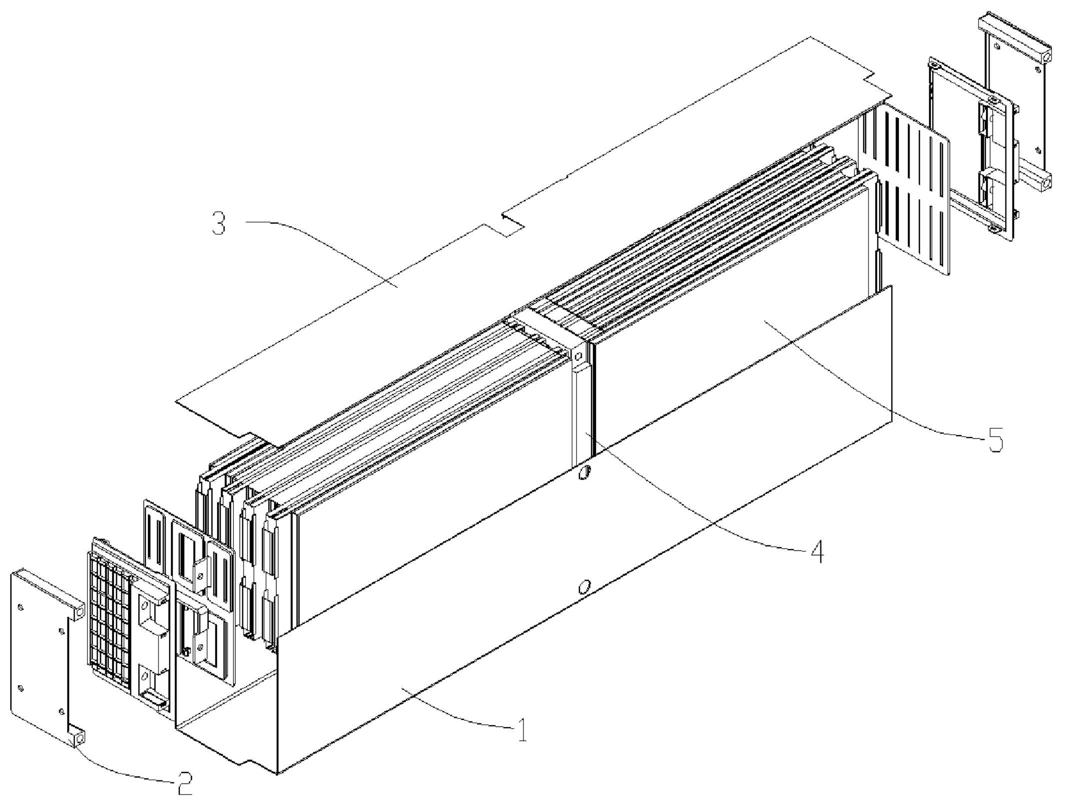
FIG. 6 is another exploded structural schematic of a pouch battery according to the present disclosure.

FIG. 6 is another exploded structural schematic of a pouch battery of the present embodiment. Two stacked module assemblies 5 are electrically connected and fixed (by pole plug welding). Heat conductive structural adhesive is coated on the inner lower side of the module outer frame 1, and the two module assemblies 5 and the intermediate end plate are respectively put into module outer frame 1. The module outer frame 1, the module side plate 3 and the intermediate end plate 4 are welded to be fixed. The module end plate 2 is fixed to the module outer frame 1 and the module side plate 3 by welding.

The pouch battery of this embodiment may be assembled in the following order:

firstly, two module assemblies are stacked;

the module assemblies are electrically connected and fixed (by pole lug welding);

heat conductive structural adhesive is coated on the inner lower side of the module outer frame in which two module assemblies are respectively put and an intermediate end plate is placed;

the insulation components at both ends of the module are assembled, the module side plate is assembled through tooling, and the module outer frame, the module side plate and the intermediate end plate are welded as a whole;

the module end plates at both ends are assembled, and the module end plates are welded with the module outer frame and the module side plate respectively; and after the welding is completed, the heat conductive adhesive is solidified, and the module is put forward for storage.

The invention claimed is:

1. A pouch battery module, wherein the pouch battery module comprises at least two module assemblies arranged along a length direction that is the longest direction of the module assemblies, and wherein an intermediate end plate for fixing the module assemblies is provided in the middle of adjacent module assemblies, wherein the intermediate end plate is provided with insulating layers on both sides corresponding to the module assemblies, wherein the module assemblies are connected in series via the intermediate end plate, wherein an outer casing of the pouch module comprises a module outer frame, a module side plate and module end plates; the module outer frame comprises a first panel, a second panel and a third panel opposite to the first panel, the second panel is fixedly connected with the first panel and the third panel respectively, and the module side plate is fixedly connected with the first panel and the third panel respectively; the module outer frame is fixedly connected with the module side plate to form an internal space having openings at both ends, and the module assemblies are placed in the internal space; two module end plates are fixedly connected with the module outer frame and the module side plate to cover the openings at both ends; module cover plates are provided on inner surfaces of the module end plates; and cover plate assemblies are provided on inner surfaces of the module cover plates, and wherein a side face of the intermediate end plate close to the third panel is provided with two through-holes corresponding to through-holes of the third panel.

2. The pouch battery module according to claim 1, wherein the pouch battery module comprises two module assemblies.

3. The pouch battery module according to claim 1, wherein the pouch battery module comprises an outer casing for enclosing the module assemblies, and wherein the intermediate end plate is fixedly connected with the outer casing through through-holes.

4. The pouch battery module according to claim 1, wherein the intermediate end plate is provided with a convex plate, and wherein the convex plate is fixedly connected with an outer casing of the pouch battery module.

5. The pouch battery module according to claim 1, wherein each of the module assemblies is a plurality of core assemblies connected in series, and wherein each of the core assemblies is a plurality of cores connected in parallel, the cores being laminated cores or winded cores.

6. The pouch battery module according to claim 1, wherein the third panel of the module outer frame is provided with two through-holes at positions close to the intermediate end plate.

7. The pouch battery module according to claim 1, wherein:

the module outer frame is provided at a middle portion thereof with a cutting groove extending transversely through the first panel; and a lower end of a middle portion of the module side plate is provided with a groove matched with the cutting groove of the module outer frame.

8. The pouch battery module according to claim 1, wherein the second panel of the module outer frame is provided, at a portion adjacent to the first panel, with extension parts extending oppositely along a length direction of the second panel.

9. The pouch battery module according to claim 1, wherein the pouch battery module has a length twice a length of a module with a length of 390 mm, and wherein a height and a width of the pouch battery module are the same as a height and a width of the module.

10. An electric vehicle comprising a pouch battery module, wherein the pouch module comprises at least two module assemblies arranged along a length direction that is the longest direction of the module assemblies, and wherein an intermediate end plate for fixing the module assemblies is provided in the middle of adjacent module assemblies, wherein the intermediate end plate is provided with insulating layers on both sides corresponding to the module assemblies, wherein the module assemblies are connected in series via the intermediate end plate, wherein an outer casing of the pouch module comprises a module outer frame, a module side plate and module end plates; the module outer frame comprises a first panel, a second panel and a third panel opposite to the first panel, the second panel is fixedly connected with the first panel and the third panel respectively, and the module side plate is fixedly connected with the first panel and the third panel respectively; the module outer frame is fixedly connected with the module side plate to form an internal space having openings at both ends, and the module assemblies are placed in the internal space; two module end plates are fixedly connected with the module outer frame and the module side plate to cover the openings at both ends; module cover plates are provided on inner surfaces of the module end plates; and cover plate assemblies are provided on inner surfaces of the module cover plates, and wherein a side face of the intermediate end plate close to the third panel is provided with two through-holes corresponding to through-holes of the third panel.

11. The electric vehicle according to claim 10, wherein the pouch battery module comprises two module assemblies.

12. The electric vehicle according to claim 10, wherein the pouch battery module comprises an outer casing for enclosing the module assemblies, and wherein the intermediate end plate is fixedly connected with the outer casing through through-holes.

13. The electric vehicle according to claim 10, wherein the intermediate end plate is provided with a convex plate, and wherein the convex plate is fixedly connected with an outer casing of the pouch battery module.

* * * * *